July 19, 1955     T. KENNEDY     2,713,383
PIPE COVERING AND METHOD OF APPLYING THE SAME
Filed Jan. 28, 1952
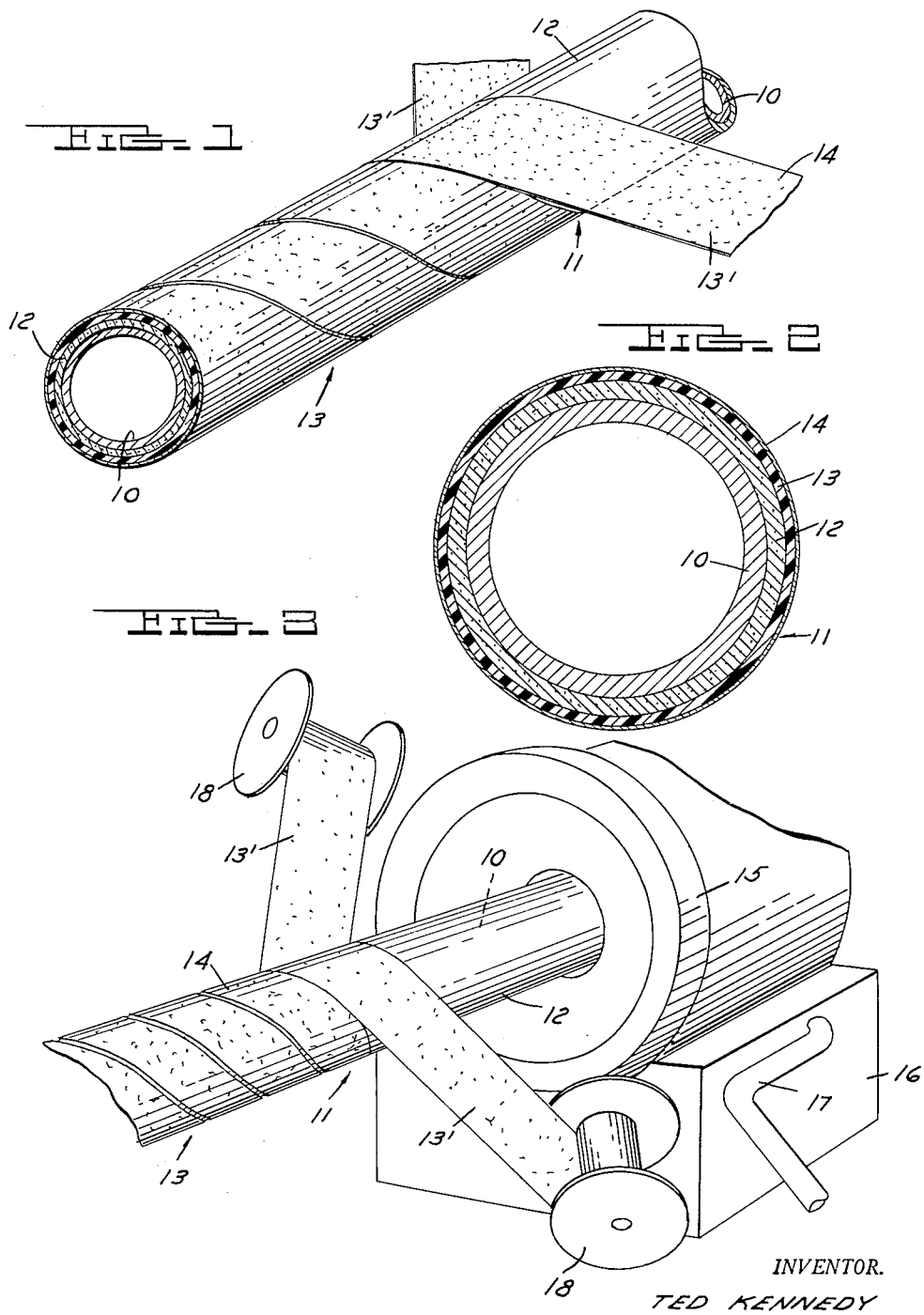
INVENTOR.
TED KENNEDY
BY
*Whittemore, Hulbert & Belknap*
ATTORNEYS

United States Patent Office 2,713,383
Patented July 19, 1955

2,713,383

PIPE COVERING AND METHOD OF APPLYING THE SAME

Ted Kennedy, Ann Arbor, Mich., assignor to The Trenton Corporation, Ann Arbor, Mich., a corporation of Michigan Application January 28, 1952, Serial No. 268,492

3 Claims. (Cl. 154—41)

This invention relates generally to an improved non-corrodible pipe covering, and to a method of applying the same to a length of pipe.

It is an object of this invention to provide a simple, inexpensive covering capable of being readily applied to lengths of pipe requiring protection from the elements and particularly applicable to pipes adapted to be buried in the ground. In accordance with this invention the length of pipe is protected from chemical attack by the soil by a relatively soft compound applied to the surface of the pipe while in a molten or softened state, and is protected from soil stresses by a plastic film providing a sealed enclosure for the coating. The plastic film employed is preferably of a composition which resists chemicals, fungi, oils and water so that this film also assists the coating compound in protecting the length of pipe against corrosion.

It is another object of this invention to provide the plastic film with a protective covering which greatly assists the film in protecting the pipe against mechanical damage during handling and during the back filling operation. According to this invention the protective covering may be in the form of aluminum or similar metal flakes or particles bonded in the plastic film by the resin embodied in the film. The resulting relatively bright metal finish reflects sunlight and has the effect of keeping the temperature of the length of pipe below the softening point of the coating compound prior to burying the pipe in the soil.

It is still another object of this invention to provide a plastic film embodying a type of resin which shrinks at temperatures somewhat below the temperature at which the coating compound is applied to the length of pipe. In the preferred embodiment of this invention the plastic film having the outer surface pigmented with the desired protective particles is helically wrapped around the coating compound in a manner such that the marginal edges of adjacent convolutions overlap. Also the plastic film is preferably applied to the coating compound while the latter is at a temperature in the shrinking range of the film, so that the overlapping marginal edges of the film are actually shrunk on the coating compound. Hence the plastic film intimately engages the compound throughout the length of the film and provides a protective enclosure for the compound.

The foregoing as well as other objects will be made more apparent as this description proceeds, especially when considered in connection with the accompanying drawing, wherein:

Figure 1 is a fragmentary perspective view of a length of pipe having a protective covering embodying the features of this invention;

Figure 2 is a cross sectional view on an exaggerated scale through the pipe shown in Figure 1; and Figure 3 is a semidiagrammatic perspective view of one type of apparatus which may be used to apply the protective covering to the pipe.

In Figure 1 of the drawing a length of pipe 10 is shown as having a protective covering 11 comprising a corrosion resisting compound 12, and a wrapping 13 enclosing the compound. The pipe 10 may be formed of steel, cast iron or any material requiring protection from the elements and adapted to be buried in the soil. The coating compound 12 may be of the bituminous type or may be in the form of a petroleum type wax having the required rust inhibitors and wetting agents. Such waxes are well known to the trade and are preferred in most instances, not only because they possess excellent corrosion resisting qualities, but also because they may be readily applied to a length of pipe. Most waxes available to the trade for the above purpose have a softening point in the neighborhood of 165° F., and according to this invention, are applied to the length of pipe 10 at temperatures in the range of approximately 250° F. and 350° F. The temperature of the wax being applied to the pipe may be varied considerably, and depends to some extent on the nature of the wrapping 13, as will become apparent from the following description.

The wrapping 13 comprises plastic or resin strips or films having particles 14 of a protective material therein. In the present instance the wrapping or film is composed of a thermoplastic resin and during manufacture or while the film is in a softened state, the film is pigmented with the particles 14 so that these particles are bonded to the film by the resin embodied therein. The particles are preferably formed of metal and a nonferrous relatively bright metal is preferred due to the light reflecting characteristics of such metals, and due to the fact that such metals are light in weight. Aluminum flake, for example, provides the film with exceptionally high light reflecting characteristics, and not only protects the plastic film from sun rays, but also serves to maintain the temperature of the length of pipe below the softening temperature of the wax coating 12 on the pipe. In addition the metal particles embedded in the film have a tendency to strengthen the film and protect the covering from mechanical damage during handling of the pipe. Although the metal particles 14 may be applied to the top surface of the resin while the latter is in a softened state, nevertheless, it is preferred to incorporate the particles in the resin compound during fabrication, so that the particles are completely coated with a film of the resin.

The plastic film is preferably formed of a polyvinylidene chloride resin, although other vinyl types of resins may be used, such for example, as polyethylene. In any case the thermoplastic resin employed should be shrinkable at temperatures below the temperature at which the wax coating 12 is applied to the length of pipe 10. Polyvinylidene chloride resins as well as some other vinyl resins have a softening point in the range of 160° F. to 350° F., and such resins shrink in the range of temperatures at which the coating of wax is applied. Also many of such resins, and especially polyvinylidene chloride resins, have high mechanical strength, good dielectric strength, excellent abrasion resistance, extremely low water-vapor transmission, are exceptionally flexible over wide ranges of temperatures, may be economically produced in films having a gage as thin as .0005 inch, and resist chemicals, fungi, oils and water. Hence resins of the above type are especially suitable for use as a protective coating for the wax compound 12.

The wrapping or film 13 is helically wound over the wax coating 12 in a manner such that the marginal edges of adjacent convolutions overlap as shown in Figure 1, and this is accomplished before the wax coating 12 previously applied to the length of pipe 10 cools to a temperature below the temperature at which the resin film 13 shrinks. Thus the residual heat in the wax coating is transferred to the resin film 13, and heats the latter sufficiently to shrink the same in intimate contact with the wax coating. Also as the film 13 shrinks, the overlapping marginal edges of adjacent convolutions of the film assume throughout their areas an intimate surface to surface contact which in effect forms a seal; and as a result, provides a protective enclosure for the length of pipe 10. In this connection attention is called to the fact that the shrinking of the resin film 13 on the wax coating 12 places the film under considerable tension, and due to the dimensional stability of the film, it remains under tension indefinitely.

In Figure 3 of the drawings a typical machine is diagrammatically shown for coating the length of pipe 10. The numeral 15 indicates a ring through which the pipe 10 extends. The ring 15 is supported for rotation around the pipe 10 on a frame 16 and the latter is movable along the length of pipe 10. The usual means not shown herein is supported on the frame 16 for applying molten wax on the length of pipe 10 in advance of the ring 15, and the required quantity of molten wax is supplied to the applying means through a conduit 17 from a source of supply spaced from the applying means. The machine frame 16 is advanced along the length of pipe 10 in the direction of the arrow (Figure 3), and molten wax is applied to the pipe as the machine is advanced. The temperature of the wax at the point of application may vary depending on the particular composition of the wax. However most waxes available for this particular application are applied at temperatures in the range of 250° F. to 350° F. As the hot wax contacts the length of pipe 10, the temperature of the wax adjacent the pipe surface drops sufficiently to set or partially set, although the wax forming the outer surface of the covering remains at a temperature well above the shrinking temperature of the wrapping or film 13.

In the present instance the wrapping or film 13 comprises a plurality of strips 13' packaged on spools 18 supported on the ring 15 for rotation about axes inclined to the axis of rotation of the ring. The arrangement is such that rotation of the ring around the pipe 10 winds the strips 13' helically about the length of pipe 10. The strips 13' are wound around the pipe 10 as soon as possible after the wax coating 12 is applied so that very little heat is lost from the outer surface of the coating 12 before the resin is applied. The temperature at which the wax is applied to the length of pipe 10 is determined in accordance with existing conditions, so that any loss in heat between the time the wax is applied and the time the resin film is applied is not sufficient to cause a drop in temperature of the wax or coating 12 below that required to effectively shrink the resin film on the wax coating. For example if the resin strips 13' shrink at a temperature of about 200° F., and 25° F. to 50° F. is lost before the strips 13 are wound on the wax, it is preferred to apply the wax to the pipe at a temperature somewhat above 250° F. This latter temperature must, of course, be below the melting temperature of the resin, which in the case of most polyvinylidene chloride resins, is 300° F. or higher. It is difficult to define a definite temperature chart for the operation as the temperatures vary in accordance with the specific materials used, the ambient temperature, the speed of advancement of the machine, and the distance between the point of application of the wax and the application of the resin film. The specific temperatures noted above are merely given as examples, and should not be considered as limiting the invention.

What I claim as my invention is:

1. The method of protecting pipe from corrosion which comprises heating a heat-softenable corrosion-resistant material to a temperature above its softening temperature, applying a coating of the heat softened material to a length of pipe, covering the coating with a thermoplastic resin film which shrinks at a temperature lower than the temperature at which the coating material is applied to the pipe, by spirally winding a strip of said resin film around the coating before the latter cools to a temperature below the shrinking temperature of the resin film, and shrinking the strip of resin film into intimate contact with the coating solely by the heat of the coating.

2. The method defined in claim 1 in which the strip is wound around the coating in a manner such that the marginal edges of the adjacent convolutions thereof overlap and provide an enclosure for the coating.

3. The method of protecting pipe from corrosion which comprises heating a heat-softenable corrosion-resistant material to a temperature above its softening temperature, applying a coating of the heat softened material to a length of pipe, covering the coating with a vinyl type thermoplastic resin film which shrinks at a temperature lower than the temperature at which the coating material is applied to the pipe, by spirally winding a strip of said resin film around the coating with the marginal edges of adjacent convolutions in overlapping relation before the coating cools to a temperature below the shrinking temperature of the resin film, and shrinking the strip of resin film into intimate contact with the coating solely by the heat of the coating.

References Cited in the file of this patent

UNITED STATES PATENTS

| | | |
|---|---|---|
| 1,013,291 | Gilmore | Jan. 2, 1912 |
| 1,521,055 | Tesse | Dec. 30, 1924 |
| 1,574,615 | Fleming | Feb. 23, 1926 |
| 2,082,175 | Sutherland | June 1, 1937 |
| 2,158,772 | Beckwith | May 16, 1939 |
| 2,161,036 | Gremmel | June 6, 1939 |
| 2,262,861 | Rugeley | Nov. 18, 1941 |
| 2,551,087 | Barnhart | May 1, 1951 |
| 2,569,540 | Selby | Oct. 2, 1951 |
| 2,573,815 | Smith | Nov. 6, 1951 |